(12) United States Patent
Matheny

(10) Patent No.: US 7,578,655 B1
(45) Date of Patent: Aug. 25, 2009

(54) COMPOSITE GAS TURBINE FAN BLADE

(75) Inventor: Alfred P. Matheny, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 385 days.

(21) Appl. No.: 11/437,487

(22) Filed: May 20, 2006

(51) Int. Cl.
*F01D 5/22* (2006.01)

(52) U.S. Cl. .................. 416/95; 416/190; 416/193 R

(58) Field of Classification Search .................. 416/95, 416/132 R, 189, 190, 191, 193 R, 196 R, 416/230, 241 A
See application file for complete search history.

(56) References Cited

U.S. PATENT DOCUMENTS

| | | | |
|---|---|---|---|
| 1,263,473 A * | 4/1918 | Schellens ..................... 415/77 |
| 1,470,502 A * | 10/1923 | Steenstrup ............... 29/889.21 |
| 1,470,507 A * | 10/1923 | Steenstrup ............... 29/889.21 |
| 1,544,318 A * | 6/1925 | Hodgkinson ............ 416/193 R |
| 2,772,854 A * | 12/1956 | Anxionnaz .................. 416/190 |
| 2,971,745 A * | 2/1961 | Warren et al. ........... 416/193 R |
| 2,999,631 A * | 9/1961 | Wollmershauser .......... 416/191 |
| 3,143,283 A | 8/1964 | Downs |
| 3,262,635 A * | 7/1966 | Smuland ..................... 417/355 |
| 3,302,924 A * | 2/1967 | Castle ....................... 416/96 R |
| 3,524,712 A * | 8/1970 | Keen et al. .................. 416/233 |
| 3,610,776 A * | 10/1971 | Petrie et al. .................. 416/190 |
| 3,635,589 A | 1/1972 | Kristiansen |
| 3,768,933 A | 10/1973 | Bouiller et al. |
| 4,736,504 A * | 4/1988 | Jones ....................... 29/889.21 |
| 4,969,326 A * | 11/1990 | Blessing et al. ............ 60/226.1 |
| 5,562,419 A * | 10/1996 | Crall et al. .................... 416/190 |
| 5,988,980 A * | 11/1999 | Busbey et al. ........... 416/193 R |
| 6,454,535 B1 * | 9/2002 | Goshorn et al. ......... 416/193 R |
| 6,696,176 B2 * | 2/2004 | Allen et al. ................. 428/678 |
| 2003/0185675 A1 * | 10/2003 | Turnquist et al. ........... 415/178 |
| 2005/0053466 A1 * | 3/2005 | Finn et al. .................... 416/230 |

\* cited by examiner

*Primary Examiner*—Edward Look
*Assistant Examiner*—Aaron R Eastman
(74) *Attorney, Agent, or Firm*—John Ryznic

(57) ABSTRACT

A composite turbine blade and fan blade assembly for use in a turbo machine such as a gas turbine engine. The turbine blade assembly includes a plurality of metallic turbine blades secured to a rotor disk and forming an outer shroud assembly. A fiber reinforced composite fan blade assembly includes an annular ring with a plurality of fan blades extending there from. The annular ring has a conical shape to allow for easy installation over the outer shroud assembly, and is secured to the outer shroud assembly to force the fan blade assembly to rotate with the turbine blades, yet allow for a slight radial movement between the fan blades and the turbine blades. The turbine blades are formed of a high temperature super alloy to allow for use in a gas turbine engine, and the fan blade assembly is made from a fiber reinforced composite to allow for higher rotational speeds and smaller diameters for smaller gas turbine engines without exceeding allowable stress limits.

9 Claims, 3 Drawing Sheets

COMPOSITE GAS TURBINE FAN BLADE

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to a gas turbine engine, and more specifically to a gas turbine engine having a bypass fan.

2. Description of the Related Art Including Information Disclosed Under 37 CFR 1.97 and 1.98

Gas turbine engines exist is sizes from very small—micro turbines—to very large, such as industrial gas turbine. In an aero engine, it is beneficial to reduce the size of the gas turbine in order to fit in a smaller space and to reduce the weight. To reduce the weight and size, the diameter of the rotating blades must be reduced. However, when the diameter of the engine is reduced, the rotational speed of the engine must increase in order to provide the same performance. One of the design factors that limit the diameter or an engine is the material properties of the rotating parts such as the blades. The high rotational speeds produce high centrifugal forces that may exceed maximum design parameters.

U.S. Pat. No. 3,262,635 issued to Smuland on Jul. 26, 1966, FIG. 2 shows an integral turbine blade 34 and bypass fan blade 35 in which the two blades are formed of one piece. The size of this integral blade can be reduced only so much until the higher rotational speeds required would exceed the maximum material properties and the blade would break or plastically deform. Both the turbine blade and the fan blade is made of the same metallic material since they are one piece.

Thus, there is a need in the art of gas turbine engines to provide for a smaller integral turbine and fan blade that can operate at higher rotational speeds and still withstand the forces without damaging the blade. It is an object of the present invention to provide for a reduced weight turbine fan blade that will improve performance by reducing weight and allow for higher rotational speeds of the turbine by providing for a stronger turbine fan blade. It is another object of the present invention to provide for a turbine fan blade that can be easily assembled and installed onto a rotor disk of the gas turbine engine.

BRIEF SUMMARY OF THE INVENTION

The present invention is an integral turbine and fan blade assembly having a reduced diameter in which a composite fan blade assembly is formed with an annular fiber reinforced composite ring with fan blade extending there from, the composite fan blade assembly fitting over a turbine blade assembly made of high temperature metal alloy materials. The metal turbine blades can withstand the high temperatures of the turbine while the composite fan blades can withstand the higher rotational speeds and still allow for a smaller diameter engine. An insulating layer is formed between the metallic blade and plastic or ceramic fan blade to insulate the fan blade material from the high temperature acting on the turbine blade. The composite fan blade assembly is formed with an annular ring having a conical shape in order that the annular ring can be easily slid onto an assembly of turbine blade shrouds forming a shroud assembly and locked into place.

DETAILED DESCRIPTION OF THE INVENTION

Figure 2:
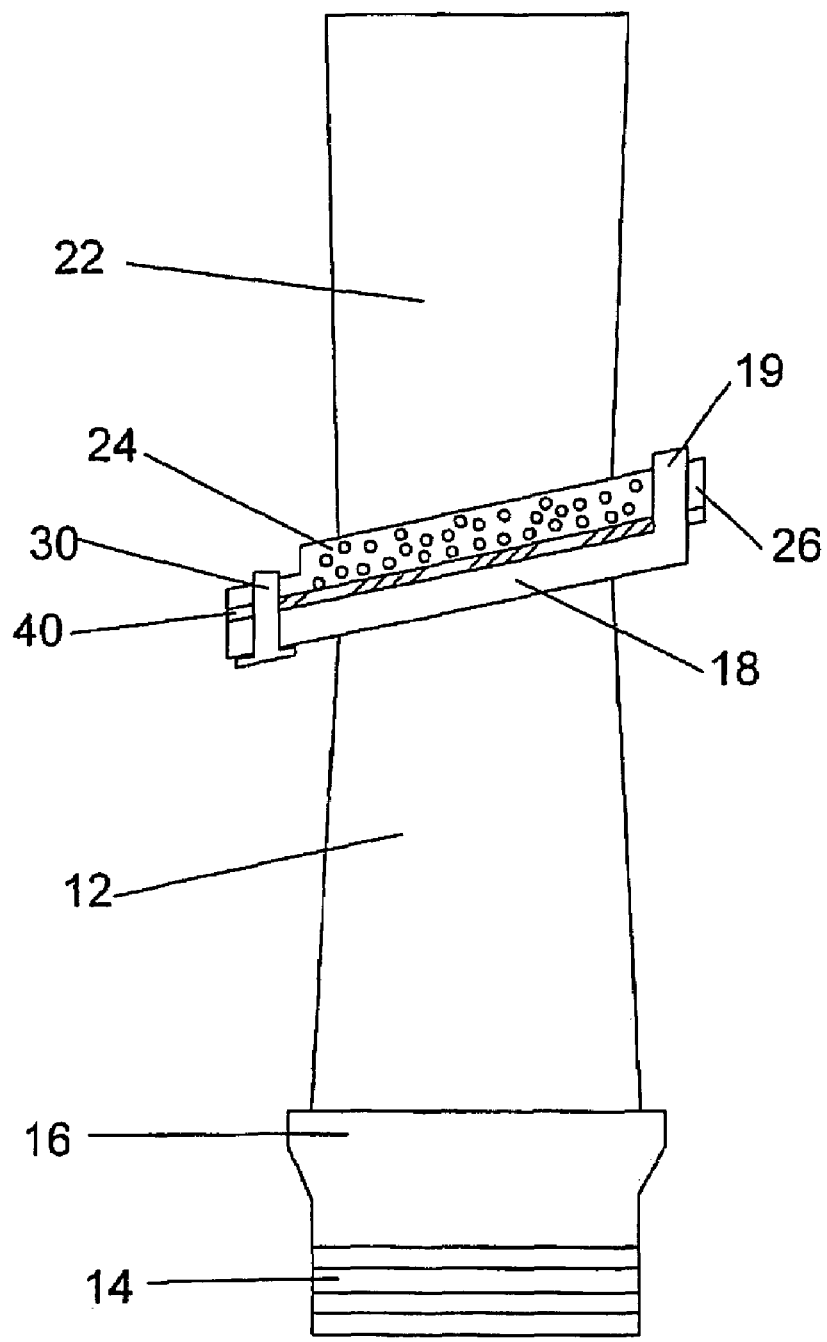
FIG. 2 shows a cross section view of the composite turbine blade and fan blade assembly of the present invention.

The present invention is a gas turbine engine with a turbine blade and fan blade assembly that rotates together. The turbine blade is driven by the hot gas stream from the combustor to drive the turbine shaft that is connected to the compressor. The turbine blade is also connected to a fan blade such that rotation of the turbine blade also causes rotation of the fan blade to create the bypass flow. FIG. 2 shows the integral turbine and fan blade assembly of the present invention. A turbine blade 12 includes an inner platform or shroud 16 and a root portion 14, the root portion 14 slides within a slot formed in the rotor disk. At the tip of the turbine blade 12 is an upper platform or outer shroud 18 with a key member 19 extending radially upward. A plurality of turbine blades 12 is secured in the rotor disk in an annular manner to form the turbine stage of the engine. The individual turbine blades 12 are made from a high temperature resistant super alloy capable of withstanding the extreme temperatures in the turbine section of the engine.

Figure 1:
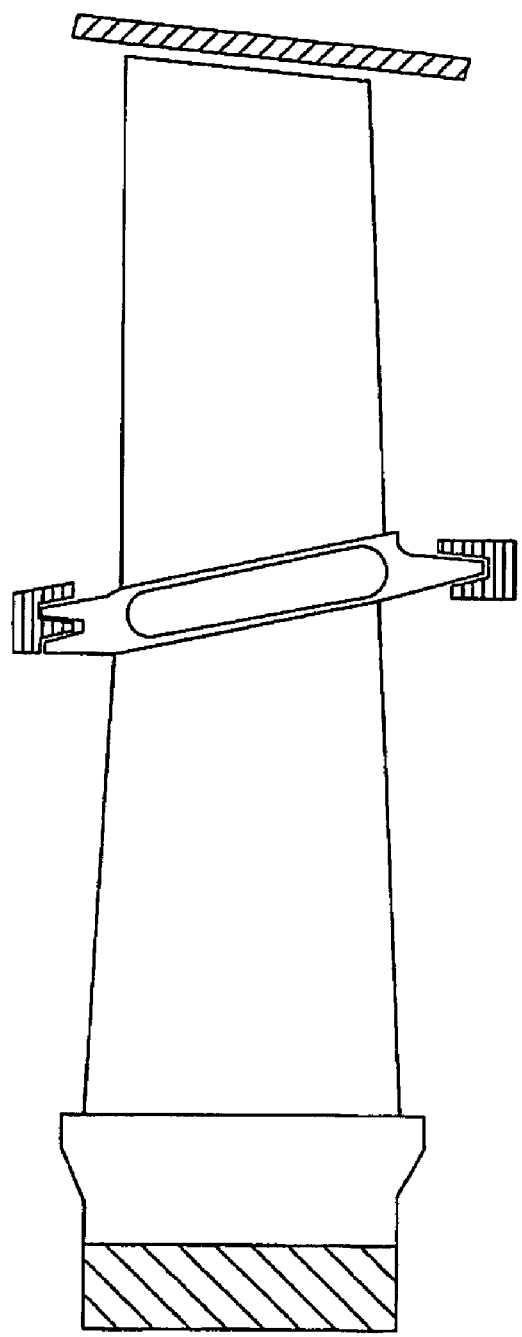
FIG. 1 shows a Prior Art turbine and fan blade assembly made of one piece.
Figure 3:
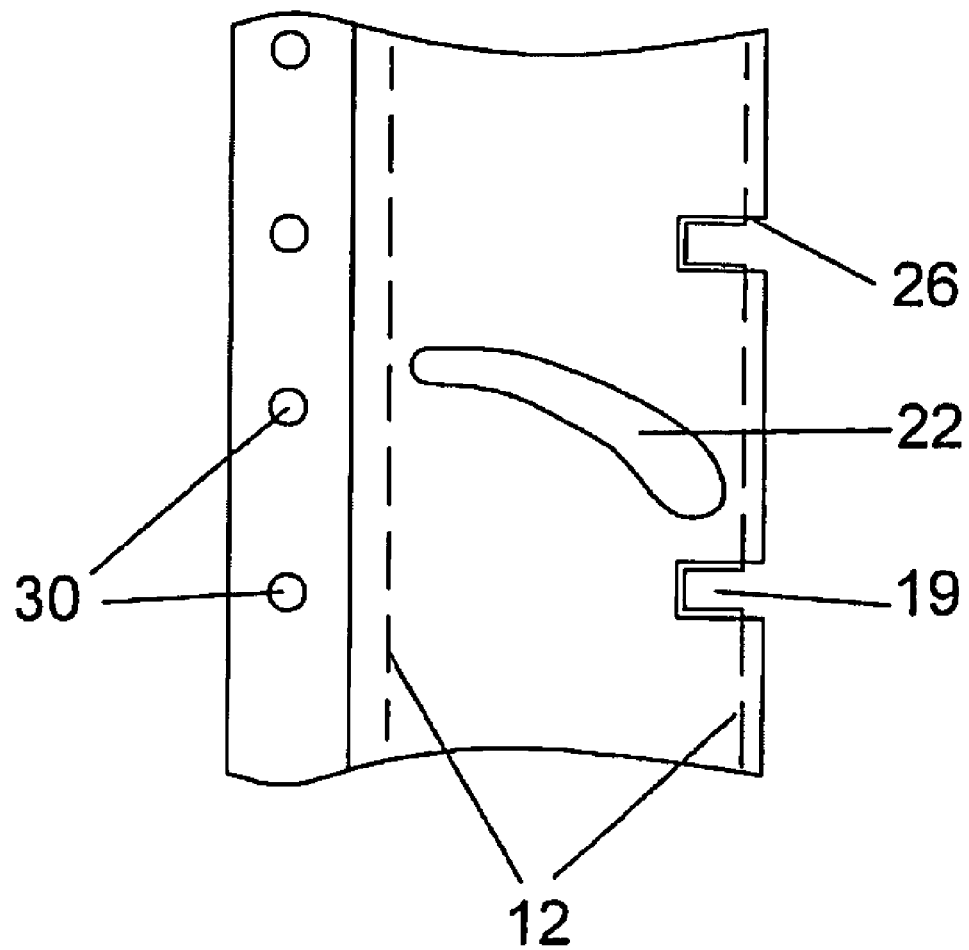
FIG. 3 shows a top view of the composite fan blade and the slots on which the turbine blade engage.

A fiber reinforced composite fan blade assembly is mounted around the outer perimeter of the turbine blade assembly. The composite fan blade assembly includes a fibrous reinforced composite annular ring 24 that forms an inner shroud of the fan blade assembly. A plurality of fan blades 22 extends outward from the annular ring 24 to form the fan blades. The fan blades and the annular ring are formed as a single piece with fibers embedded into a resinous material. Carbon fibers are used for high strength. The downstream end of the annular ring 24 includes a plurality of spaced slots 26 as seen in FIG. 3. The slots 26 fit into the radial keys 19 of the outer shroud of the turbine blades 12 and act to hold the composite annular fan blade assembly to the turbine blades 12. The keys 19 and slots 26 allow for torque transfer from the turbine blade assembly to the fan blade composite ring 24 and blades 22. A pin member 30 is secured within concentric holes formed in both the outer shroud 18 and the annular ring 24. As shown in FIG. 1, the turbine blade shroud assembly and the annular ring 24 have a conical shape with the larger diameter portion being at the downstream end. The turbine blades 12 have an outer shroud 18 with a conical shape with the larger diameter portion being at the downstream end of the hot gas stream flow to account for the decrease is in pressure of the gas stream. The annular ring 24 has a similar conical shape so that, when the turbine blades 12 are assembled to form an annular outer shroud assembly, the annular ring can be slid onto the outer shroud assembly from the upstream end. The key 19 is located on the downstream end to locate the annular ring properly onto the outer shroud assembly. A pin 30 is inserted into holes in the annular ring 24 and the outer shroud 18 to secure the annular ring 24 and prevent the ring 24 from sliding off of the shroud assembly. A plurality of pins 30 are used and allow for the annular ring 24 to expend in a radial direction with respect to the outer shroud assembly. The annular ring 24 and outer shroud 18 is shown to have a slight conical shape. However, an annular shape (not conical, where the upstream diameter is equal to the downstream diameter) would also perform the intended object of the present invention, but would be less easily installed than the conical annular ring.

An insulating layer 40 is formed between the composite annular ring 24 and the outer shroud 18 of the metallic turbine blade to prevent the high temperature acting on the turbine blade from damaging the fan blade 22 and ring 24. The insulating layer can be an insulating coating or a insulating sheet positioned between the two members. The function is to protect the composite annular ring 24 from damage due to the heat of the turbine.

The composite fan blade assembly is made of carbon fiber reinforced material and therefore is stronger than the metal fan blades of the Prior Art Smuland turbine and fan blade assembly. The composite fan blade assembly of the present invention can then be made smaller to reduce the size and weight of the gas turbine engine, and yet be allowed to operate at higher rotational speeds without damaging the fan blades 22. Also, because of the radial pins 30 and the keys 19 and slots 26, the composite ring 24 can expand radially without adding damaging stress to the fan blade assembly. The annular ring and fan blades can be made from a carbon fiber reinforced composite, or from ceramic matrix composites also with reinforcing fibers.

The present invention shows the slot 26 formed in the annular ring 24 of the fan blade assembly and the key 19 formed in the outer shroud 18 of the turbine blade assembly. However, the slot could also be formed in the outer shroud 18 while the key could be formed in the annular ring to provide for the fan blade assembly to rotate along with the turbine blade assembly. The key and slot connection allows for the annular ring to move in a radial direction with rotation of the turbine blade assembly.

I claim the following:

1. A composite turbine blade and fan blade assembly comprising:
    a rotor disk;
    a plurality of turbine rotor blades extending from the rotor disk;
    each of the rotor blades having an outer shroud to form an annular shroud for the turbine blades;
    the annular shroud for the turbine blades having a forward slant;
    a fan blade assembly having an annular ring with a plurality of fan blades extending radial outward from the annular ring;
    the annular ring having a forward slant equal to the forward slant of the annular shroud of the turbine blades;
    the fan blade assembly formed as a single piece; and,
    means to rotatably secure the fan blade assembly to the annular shroud such that rotation of the rotor disk produces rotation of the fan blade assembly.

2. The composite turbine blade and fan blade assembly of claim 1, and further comprising:
    the annular shroud includes a plurality of radial keys extending from an aft end;
    the annular ring includes a plurality of slots on the aft end; and,
    the keys and the slots being of such size and shape to allow axial movement of the fan blade assembly with respect to the annular shroud and to transmit torque from the annular shroud to the fan blade assembly.

3. The composite turbine blade and fan blade assembly of claim 2, and further comprising:
    the annular shroud and the annular ring both include a plurality of radial aligned holes; and,
    a pin secured within the radial aligned holes to prevent the fan blade assembly from coming off from the annular shroud.

4. The composite turbine blade and fan blade assembly of claim 1, and further comprising:
    the slant angle of the annular shroud and the annular ring is of such a small angle to allow for the fan blade assembly to easily slide onto the annular shroud assembly of the turbine rotor blades.

5. The composite turbine blade and fan blade assembly of claim 1, and further comprising:
    the fan blade assembly is formed from carbon fiber reinforced composite material; and,
    the turbine rotor blade and annular shroud assembly is formed from a high temperature metallic alloy material suitable for use in a gas turbine engine.

6. The composite turbine blade and fan blade assembly of claim 5, and further comprising:
    the annular ring includes circumferential fiber reinforcements.

7. The composite turbine blade and fan blade assembly of claim 6, and further comprising:
    the composite turbine blade and fan blade assembly is sized for use in a small gas turbine engine with relatively high rotation speeds.

8. The composite turbine blade and fan blade assembly of claim 1, and further comprising:
    the rotor disk includes a plurality of slots; and,
    the turbine rotor blades each include a root that fits within the slots to secure the rotor blades to the rotor disk.

9. The composite turbine blade and fan blade assembly of claim 1, and further comprising:
    an insulating layer secured between the annular shroud and the annular ring to insulate the fan blade assembly from the turbine rotor blades.

* * * * *